US012521319B2

(12) United States Patent
Lalevée et al.

(10) Patent No.: US 12,521,319 B2
(45) Date of Patent: Jan. 13, 2026

(54) DENTAL COMPOSITION

(71) Applicant: DENTSPLY SIRONA Inc., York, PA (US)

(72) Inventors: Jacques Lalevée, Mulhouse (FR); Mira Abdallah, Constance (DE); Thomas Tigges, Constance (DE); Kira Neuhaus, Constance (DE); Caroline Renn, Singen (DE); Liu Huaibing, Charlotte, NC (US)

(73) Assignee: Dentsply Sirona, Inc., York, PA (US)

( * ) Notice: Subject to any disclaimer, the term of this patent is extended or adjusted under 35 U.S.C. 154(b) by 476 days.

(21) Appl. No.: 18/028,224

(22) PCT Filed: Sep. 23, 2021

(86) PCT No.: PCT/EP2021/076226
§ 371 (c)(1),
(2) Date: Mar. 24, 2023

(87) PCT Pub. No.: WO2022/063911
PCT Pub. Date: Mar. 31, 2022

(65) Prior Publication Data
US 2023/0355482 A1 Nov. 9, 2023

(30) Foreign Application Priority Data
Sep. 24, 2020 (EP) .................. 20198217

(51) Int. Cl.
*A61K 6/887* (2020.01)
*A61K 6/62* (2020.01)

(52) U.S. Cl.
CPC ............... *A61K 6/887* (2020.01); *A61K 6/62* (2020.01)

(58) Field of Classification Search
CPC combination set(s) only.
See application file for complete search history.

(56) References Cited

U.S. PATENT DOCUMENTS

| 5,066,795 A * | 11/1991 | Umemoto | C07C 323/03 |
| | | | 549/16 |
| 6,215,021 B1 * | 4/2001 | Shreeve | C07C 381/12 |
| | | | 562/30 |
| 2011/0300484 A1 | 12/2011 | Yamato et al. | |
| 2017/0349567 A1 * | 12/2017 | Umemoto | C07D 333/76 |

FOREIGN PATENT DOCUMENTS

EP        3470048 A1    4/2019
JP    2005263796 A  *   9/2005

OTHER PUBLICATIONS

Zhang Bianxiang et al. "Synthesis and characterization of triarylsulfonium salts as novel cationic photoinitiators for UV-photopolymerization", Research on Chemical Intermediates, Amsterdam, NL, vol. 43, No. 11, Jun. 24, 2017 (Jun. 24, 2017), pp. 6617-6625, XP036336438, ISSN: 0922-6168, DOI: 10.1007/S11164-017-3009-1.

* cited by examiner

*Primary Examiner* — Peter A Salamon
(74) *Attorney, Agent, or Firm* — SCHWEGMAN LUNDBERG & WOESSNER, P.A.

(57) ABSTRACT

The present invention is related to a dental composition comprising at least one polymerizable monomer having at least one ethylenically unsaturated group; and a radical initiator system comprising a photosensitizer having an absorption maximum ranging from 400 nm to 800 nm; and at least one thiophenium compound as coinitiator.

16 Claims, 3 Drawing Sheets

DENTAL COMPOSITION

FIELD OF THE INVENTION

The present invention relates to a dental composition comprising at least one polymerizable monomer having at least one ethylenically unsaturated group; and a radical initiator system comprising a photosensitizer having an absorption maximum ranging from 400 nm to 800 nm; and at least one coinitiator compound.

BACKGROUND OF THE INVENTION

The restoration of teeth commonly involves a photocurable dental composition containing free radically polymerizable resins. Photocuring of a dental composition involves a photoinitiator system generating free radicals upon exposure to visible light. Conventionally, photosensitizers such as camphorquinone (CQ) optionally in combination with a tertiary aromatic amine are frequently used as photoinitiator systems.

However, the presence of amines in (meth)acrylate containing compositions can cause yellowing in the resulting photocured composition. Another disadvantage of the tertiary aromatic amine is their discoloration tendency and their sensitivity to strong acidic media. Furthermore, aromatic tertiary amines react with oxygen radicals. Thus, while beneficial on the one hand that its use avoids a sticky surface, on the other hand more aromatic amine is needed for initiation than the stoichiometric requirement with the respective photosensitizer such as CQ. Tertiary amines for use as coinitiators in dental compositions may leach out of the cured composition which may give rise to toxicological concern. Especially, the toxicological concerns about tertiary aromatic amines requires the development of new coinitiators for photosensitizers such as CQ in dental materials.

OBJECTIVE OF THE PRESENT INVENTION

In view of the prior art, it was thus an object of the present invention to provide a new dental composition comprising an initiator system, which shall not exhibit the aforementioned shortcomings of the known prior art dental compositions.

In particular, it was an object of the present invention to provide a dental composition comprising a radical initiator system, which shall be at least substantially free, preferably completely free, of amines, especially of tertiary amines, more especially of tertiary aromatic amines.

What is needed therefore is a way to provide new coinitiators for common photosensitizers, such as camphorquinone, in dental compositions, wherein the coinitiators are free of amines.

Furthermore, it was an object of the present invention to provide a dental composition comprising a radical initiator system containing a combination of a photosensitizer and at least one specific amine free coinitiator, wherein such an inventive dental composition can reduce, or ideally avoid or eliminate, the leaching problems and the toxicological concerns of the commonly uses coinitiators based on tertiary aromatic amines, while improving the required biocompatibility simultaneously.

SUMMARY OF THE INVENTION

These objects and also further objects which are not stated explicitly but are immediately derivable or discernible from the connections discussed herein by way of introduction are achieved by a dental composition having all features of claim 1. Appropriate modifications of the dental composition are protected in dependent claims 2 to 15.

The present invention accordingly provides a dental composition comprising
  a) at least one polymerizable monomer having at least one ethylenically unsaturated group; and
  b) a radical initiator system comprising
    i. a photosensitizer having an absorption maximum ranging from 400 nm to 800 nm; and
    ii. at least one coinitiator compound;
characterized in that
the at least one coinitiator compound is a thiophenium salt consisting of a thiophenium cation and a monovalent anion; wherein the thiophenium cation has the following formula (I):

wherein
$R_1$=a $C_1$-$C_8$ alkyl having at least one hydrogen atom of said $C_1$-$C_8$ alkyl substituted by a halogen atom;
$R_2$, $R_3$, $R_4$, $R_5$, $R_6$, $R_7$, $R_8$, $R_9$=a hydrogen, a $C_1$-$C_8$ alkyl, a $C_1$-$C_8$ alkyl having at least one hydrogen atom of said $C_1$-$C_8$ alkyl substituted by a halogen atom, or a halogen.

It is thus possible in an unforeseeable manner to provide a new dental composition comprising an initiator system, which does not exhibit the aforementioned shortcomings of the known prior art dental compositions.

In particular, the present invention provides a dental composition comprising a radical initiator system, which is at least substantially free, preferably completely free, of amines, especially of tertiary amines, more especially of tertiary aromatic amines.

Thereby, the present invention provides new coinitiators for common photosensitizers, such as camphorquinone, in dental compositions, wherein the coinitiators are free of amines.

Furthermore, a dental composition is provided, which comprises a radical initiator system containing a combination of a photosensitizer and at least one specific coinitiator, wherein such an inventive dental composition can reduce, or ideally avoid or eliminate, the leaching problems and the toxicological concerns of the commonly uses coinitiators based on tertiary aromatic amines, while improving the required biocompatibility simultaneously.

The dental composition comprising such a specific inventive coinitiator provides improved polymerization efficiency including a good conversion without posing leaching problems of aromatic amines. Such a specific inventive coinitiator of the present invention is stable to strong acidic media and thereby suitable for dental application such as adhesives, composites, cements and self-etching preparations. Such coinitiators of the present invention when being incorporated into such a dental composition have low tendency towards discoloration while exhibiting good storage stability at the same time.

The at least one coinitiator acts by initiating polymerization of one or more polymerizable monomers having at least one ethylenically unsaturated groups. The coinitiators of the present invention provide biocompatibility with reduced release of components when incorporated into such dental compositions.

BRIEF DESCRIPTION OF THE FIGURES

For a more complete understanding of the present invention, reference is made to the following Detailed Description of the Invention considered in conjunction with the accompanying figures, in which.

DETAILED DESCRIPTION OF THE INVENTION

The term "alkyl", unless otherwise specified, refers to a monoradical branched or unbranched saturated hydrocarbon chain having from 1 to 18 carbon atoms. This term can be exemplified by groups such as methyl, ethyl, n-propyl, iso-propyl, n-butyl, iso-butyl, sec-butyl, t-butyl, n-pentyl, isopentyl, neopentyl, n-hexyl, n-decyl, dodecyl, tetradecyl, and the like.

The term "alkoxy group", unless otherwise specified refers to a monoradical branched or unbranched saturated hydrocarbon chain having from 1 to 18 carbon atoms, wherein at least one carbon atom of such an alkoxy group is substituted by one oxygen atom. Such an alkoxy group is attached by said at least one oxygen atom to a carbon atom of a chemical compound. This term can be exemplified by groups such as methoxy, ethoxy, and the like. That means the term "alkoxy group" is defined in the context of the present invention as any chemist would understand it based on common chemical knowledge.

The term "alkylene", unless otherwise specified refers to a linear saturated divalent hydrocarbon radical of one to four carbon atoms or a branched saturated divalent hydrocarbon radical of three to four carbon atoms, e.g., methylene, ethylene, 2,2-dimethylethylene, propylene, 2-methylpropylene, butylene and the like, preferably methylene, ethylene, or propylene.

The term "aryl" refers to C6-C10-membered aromatic, heterocyclic, fused aromatic, fused heterocyclic, biaromatic, or bihetereocyclic ring systems. Broadly defined, "aryl", as used herein, includes 5-, 6-, 7-, 8-, 9-, and 10-membered single-ring aromatic groups that may include from zero to four heteroatoms, for example, benzene, pyrrole, furan, thiophene, imidazole, oxazole, thiazole, triazole, pyrazole, pyridine, pyrazine, pyridazine, pyrimidine, and the like. Those "aryl" groups having heteroatoms in the ring structure may also be referred to as "heteroaryl" or "heterocycles" or "heteroaromatics". The aromatic ring can be substituted at one or more ring positions with one or more substituents including, but not limited to, halogen, azide, alkyl, aralkyl, alkenyl, alkynyl, cycloalkyl, hydroxyl, alkoxyl, amino (or quaternized amino), nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —CF3, —CN, and combinations thereof.

The term "cycloalkyl" refers to monocyclic or polycyclic cycloalkyl radical. Examples of monocyclic acycloakyl include cyclopropyl, cyclobutyl, cyclopentyl, cyclohexyl, cycloheptyl, and cyclooctyl. Examples of polycyclic cycloalkyl radical include, for example admantyl, norbornyl, decalinyl, 7,7-dimethyl-bicyclo[2.2.1]heptanyl, tricyclo [5.2.1.02,6]decyl and the like.

The term "(meth)acrylate" in the context of the present disclosure is meant to refer to the acrylate as well as to the corresponding methacrylate.

The term "(meth)acrylamide" in the context of the present disclosure is meant to include acrylamide and methacrylamide.

The term "polymerizable monomer" in the context of the present disclosure means any monomer capable of radical polymerization. The polymerizable monomer includes at least one ethylenically unsaturated groups. The at least one ethylenically unsaturated groups include vinyl, allyl, acryl, methacryl, and styryl.

The term "a polymerizable monomer having at least one ethylenically unsaturated group" and "ethylenically unsaturated monomers" may be used interchangeably.

The term "radical initiator system" in the context of the present disclosure means any system comprising a sensitizer and at least one coinitiator forming free radicals when activate by thermal or light and/or ambient redox conditions, whereby polymerization of polymerizable monomer is initiated.

The term "coinitiator" in the context of the present disclosure means a compound that does not essentially absorb when exposed with UV radiation or visible light but forms free radicals together with the sensitizers used according to the present disclosure.

The term "sensitizer" in the context of the present disclosure which can absorb radiation of a wavelength in the range of 400 to 800 nm, when it is exposed but which cannot by itself, i.e. without the addition of coinitiators, form free radicals. Sensitizers used in the present disclosure have to be capable of interacting with the coinitiators used in the present disclosure.

The present disclosure relates to a dental composition. The dental composition is selected from a dental adhesive, a dental composite, a dental sealant and a dental cement.

The dental composition of the present disclosure comprises one or more polymerizable monomers having at least one ethylenically unsaturated group.

Polymerizable monomers may be acrylates, methacrylates, ethylenically unsaturated compounds, carboxyl group-containing unsaturated monomers, C2-8 hydroxyl alkyl esters of (meth)acrylic acid, C1-24 alkyl esters or cycloalkyl esters of (meth)acrylic acid, C2-18 alkoxyalkyl esters of (meth)acrylic acid, olefins or diene compounds, monoesters/diesters, monoethers, adducts, vinyl monomer, styryl monomer, TPH resin, SDR Resin, PBA resins and/or BPA-free resins.

A Radical Initiator System

The dental composition of the present disclosure includes a radical initiator system. The radical initiator system may include a photoinitiator. Suitable photoinitiators may be in the form of a binary or tertiary system. A binary system may include a photosensitizer and a thiophenium salt as coinitiator. A tertiary system may further include additionally an iodonium, sulfonium or phosphonium salt.

In one embodiment, the monovalent anion of the thiophenium salt is selected from the group consisting of a sulfonate, a substituted sulfonate, a borohydride, and a substituted borohydride.

In a preferred embodiment thereof, the monovalent anion of the thiophenium salt is selected from the group consisting of an alkyl sulfonate, a substituted alkyl sulfonate, a borohydride, and a substituted borohydride having at least one hydrogen atom of said borohydride substituted by a halogen atom.

In an even more preferred embodiment, the monovalent anion of the thiophenium salt is selected from the group consisting of a substituted alkyl sulfonate having at least one hydrogen atom, preferably all hydrogen atoms, of the alkyl group of said alkyl sulfonate substituted by a halogen atom, and a substituted borohydride having all hydrogen atoms of said borohydride substituted by a halogen atom.

In another preferred embodiment, the thiophenium cation has the following formula (II):

wherein

$R_4$, $R_7$, $R_{10}$, $R_{11}$, $R_{12}$=a hydrogen, a $C_1$-$C_8$ alkyl, a $C_1$-$C_8$ alkyl having at least one hydrogen atom of said $C_1$-$C_8$ alkyl substituted by a halogen atom, or a halogen; with the proviso that at least one of $R_{10}$, $R_{11}$, $R_{12}$=a $C_1$-$C_8$ alkyl having at least one hydrogen atom of said $C_1$-$C_8$ alkyl substituted by a halogen atom, or a halogen.

In a more preferred embodiment thereof, $R_4$ and $R_7$=a hydrogen or a halogen, and $R_{10}$, $R_{11}$, $R_{12}$=a halogen.

In a further preferred embodiment, the thiophenium cation has one of the following formulas (III) or (IV):

In one embodiment, the thiophenium salt is present in an amount of from 0.1 to 5 percent by weight, preferably in an amount of from 0.15 to 2.5 percent by weight, and more preferably in an amount of from 0.2 to 2 percent by weight, based on the total weight of the dental composition.

Conclusively, according to one embodiment of the present invention, the at least one coinitiator is a compound according to one of the above-defined formulas (I), (II), (III), or (IV).

In one embodiment, more than one coinitiator compound is comprised by the inventive radical initiator system, wherein all comprised coinitiator compounds are compounds according to one of formulas (I), (II), (III), or (IV).

In an alternative embodiment, more than one coinitiator compound is comprised by the inventive radical initiator system, wherein each of the comprised coinitiator compounds are compounds according to one of formulas (I), (II), (III), or (IV), and wherein at least two of these coinitiators compounds are compounds according to the same formula (I), (II), (III), or (IV).

In a further alternative embodiment, more than one coinitiator compound is comprised by the inventive radical initiator system, wherein all comprised coinitiators are compounds according to the same formula (I), (II), (III), or (IV).

In one embodiment, the photosensitizer is a 1,2-diketone compound.

The alpha-diketone sensitizer compound may be selected from cam phorquinone, 1,2-diphenylethane-1,2-dione (benzil), 1,2-cyclohexanedione, 2,3-pentanedione, 2,3-hexanedione, 3,4-hexanedione, 2,3-heptanedione, 3,4-heptanedione glyoxal, biacetyl, 3,3,6,6-tetramethylcyclohexanedione, 3,3,7,7-tetramethyl-1,2-cycloheptanedione, 3,3,8,8-tetramethyl-1,2-cyclooctanedione; 3,3,18,18-tetramethyl-1,2-cyclooctadecanedione; dipivaloyl; furil, hydroxybenzil, 2,3-butanedione, 2,3-octanedione, 4,5-octanedione, and 1-phenyl-1,2-propanedione.

In a preferred embodiment, the photosensitizer is camphorquinone (CQ).

In one embodiment, the photosensitizer is present in an amount of from 0.1 to 5 percent by weight, preferably in an amount of from 0.15 to 2.5 percent by weight, and more preferably in an amount of from 0.2 to 2 percent by weight, based on the total weight of the dental composition.

In one embodiment, the ratio of the amount of the photosensitizer to the amount of coinitiator is ranging from 1:2.5 to 2.5:1, preferably from 1:3.5 to 3.5:1, and more preferably from 1:5 to 5:1.

In one embodiment, the radical initiator system is present in an amount of from 0.1 to 10 percent by weight based on the total weight of the dental composition.

In one embodiment, the dental composition comprises a radical initiator system, which is at least substantially free, preferably completely free, of amines, especially of tertiary amines, more especially of tertiary aromatic amines.

In one embodiment, the dental composition further comprises an additive selected from iodonium salts, phosphonium salts, and sulfonium salts; preferably wherein said additive is an iodonium salt.

In one preferred embodiment thereof, the additive is present in an amount of from 0.01 to 5 percent by weight based on the total weight of the dental composition.

Such an iodonium compound can comprise the following Formula (C):

$$R_{21}\text{—I}^+\text{—}R_{22}\ A^- \qquad \text{Formula (C)}$$

wherein $R_{21}$ and $R_{22}$ are independent from each other, represent an organic moiety, and $A^-$ is an anion.

In embodiments, iodonium compounds include diphenyliodonium (DPI) hexafluorophosphate, di(4-methylphenyl) iodonium (Me2-DPI) hexafluorophosphate, di-(4-t-butylphenyl)-iodonium hexafluorophosphate, diaryliodonium hexafluoroantimonate, (4-methylphenyl)[4-(2-methylpropyl) phenyl] iodonium hexafluoroantimonate, (4-methylphenyl)[4-(2-methylpropyl)phenyl]iodonium hexafluorophosphate (Irgacure® 250, commercial product available from BASF SE), (4-methylphenyl)[4-(2-methylpropyl) phenyl] iodonium tetrafluoroborate, 4-octyloxyphenyl phenyliodonium hexafluoroantimonate, 4-(2-hydroxytetradecyloxy-phenyl) phenyliodonium hexafluoroantimonate, and 4-isopropyl-4'-methyldiphenyliodonium borate.

According to a further embodiments, the iodonium compound is Bis-(4-t-butylphenyl)-iodonium hexafluorophosphate (SC938), di(4-methylphenyl)iodonium (Me2-DPI) hexafluorophosphate, or Bis(4-tert-butylphenyl)iodonium p-toluenesulfonate.

According to yet further embodiments, the photo initiator may include a sulfonium compound of the following Formula (D):

$R_{23} R_{24} R_{25} S^+ A^-$   Formula (D)

wherein $R_{23}$, $R_{24}$ and $R_{25}$ are independent from each other, represent an organic moiety or wherein any two of $R_{23}$, $R_{24}$ and $R_{25}$ form a cyclic structure together with the sulfur atom to which they are bound, and $A^-$ is an anion.

The triaryl sulfonium salt may be S-(phenyl)thianthrenium hexafluorophosphate:

PF$_6$

According to a further embodiment, the photo initiator may include a phosphonium compound of the following Formula (E):

$R_{26} R_{27} R_{28} R_{29} P^+ A^-$   Formula (E)

wherein $R_{26}$, $R_{27}$, $R_{28}$ and $R_{29}$ are independent from each other, represent an organic moiety, and $A^-$ is an anion.

The phosphonium salts of Formula (E) may be tetraalkyl phosphonium salts tetrakis-(hydroxymethyl)-phosphonium (THP) salt or a tetrakis-(hydroxymethyl)-phosphonium hydroxide (THPOH) salt, wherein the anion of the tetraalkyl phosphonium salt is selected from the group consisting of formate, acetate, phosphate, sulphate, fluoride, chloride, bromide and iodide.

Other suitable photoinitiators for polymerizing free radically photopolymerizable compositions may include the class of phosphine oxides that typically have a functional wavelength range of about 380 nm to about 1200 nm. Further suitable phosphine oxide free radical initiators with a functional wavelength range of about 380 nm to about 450 nm are acyl and bisacyl phosphine oxides.

The present invention thus addresses the problem of providing an inventive dental composition comprising an amended initiator system.

The following non-limiting examples are provided to illustrate an embodiment of the present invention and to facilitate understanding of the invention but are not intended to limit the scope of the invention, which is defined by the claims appended hereto.

The following different thiophenium salts have been used for inventive and comparative experiments:

Thiophenium 1

Thiophenium 2

Thiophenium 3

Thiophenium 4

Thiophenium 5

Thiophenium 6

Example 1: Systematic Investigation of All Six Different Thiophenium Salts Shown Above as Coinitiator in Combination With CQ in Comparison to CQ in Combination With a Tertiary Amine for Polymerization of Prime & Bond Active Resins (a Methacrylate Resin)

Figure 1:
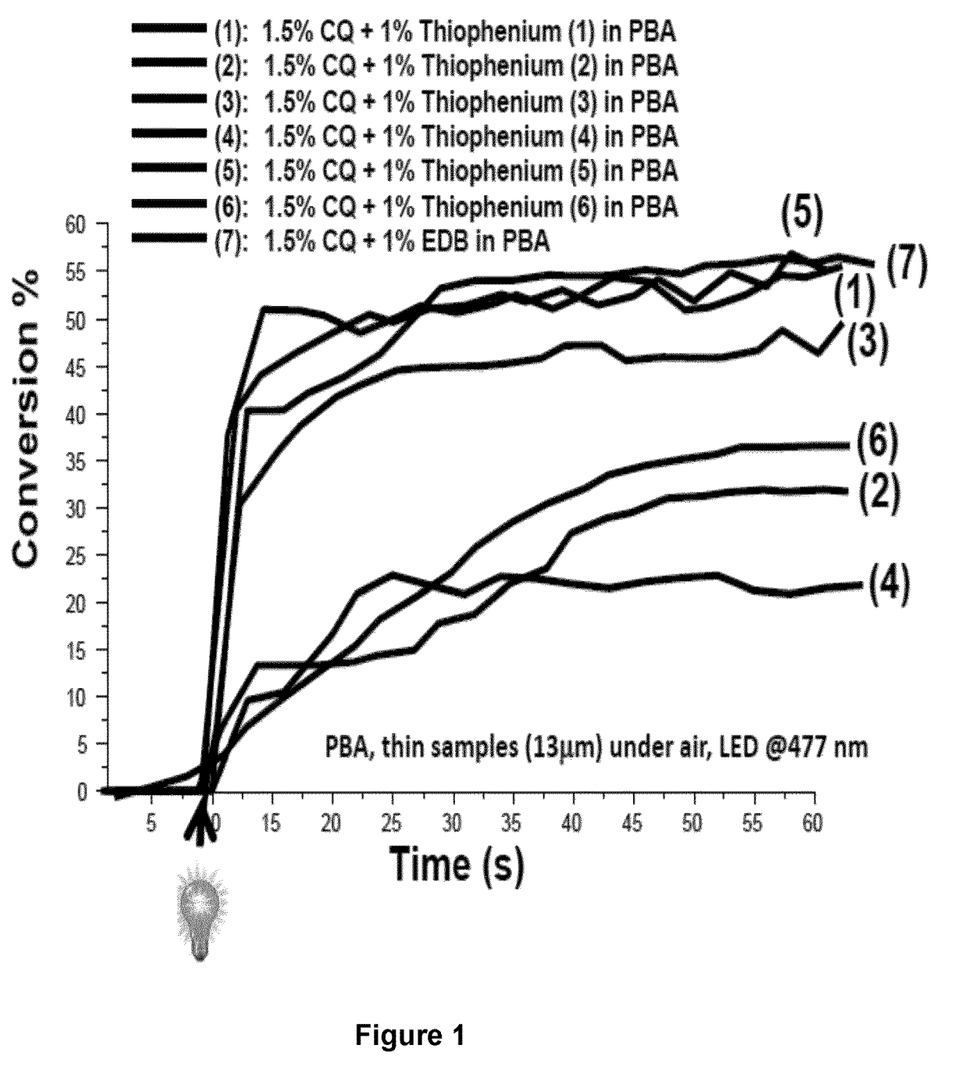
FIG. 1 depicts photopolymerization profiles of six different thiophenium salts as coinitiator in combination with CQ in comparison to CQ in combination with a tertiary amine for polymerization of Prime & bond Active resins (a methacrylate resin)

Photopolymerization profiles (shown in FIG. 1) of C=C double bonds (PrimeBond Active) in presence of camphorquinone (CQ) as photoinitiator (under air; thickness=13 µm; SmartLite Focus 300 mW·cm$^{-2}$):

(1) CQ/Thiophenium 1 (1.5/1% w/w)
(2) CQ/Thiophenium 2 (1.5/1% w/w)
(3) CQ/Thiophenium 3 (1.5/1% w/w)
(4) CQ/Thiophenium 4 (1.5/1% w/w)
(5) CQ/Thiophenium 5 (1.5/1% w/w)
(6) CQ/Thiophenium 6 (1.5/1% w/w) and
(7) CQ/Ethyl-4-(dimethylamino) benzoate (EDB) (1.5/1% w/w).

The irradiation (LED @ 477 nm) starts at t=8 s (as depicted in FIG. 1).

Herein, it is clearly demonstrated that the inventive effect is only achieved, meaning having a photopolymerization conversion at least similar to the well known established prior art system of CQ and a tertiary amine like EDB, if chemical compounds of formula (I) as claimed in claim 1 is chosen to substitute EDB.

Good results have been achieved for the inventive examples of Thiophenium 1, 3, and 5; while comparative examples have been produced by making use of Thiophenium 2, 4, and 6. Thiophenium 1, 3, and 5 have been proven thereby to offer a promising approach for replacing tertiary amines by certain specific thiophenium compounds. However, as shown, even in this case, the applicant has carefully studied possible candidates in order to investigate which thiophenium compounds (salts) are suitable for this application and which not.

Example 2: Systematic Investigation of Different Amounts of Thiophenium Salt 5 (Shown Above) as Coinitiator in Combination With Different Amounts of CQ; in Comparison to CQ in Combination With an Iodonium Compound (SC938) for Polymerization of Prime & Bond Active Resins (a Methacrylate Resin)

Figure 2:
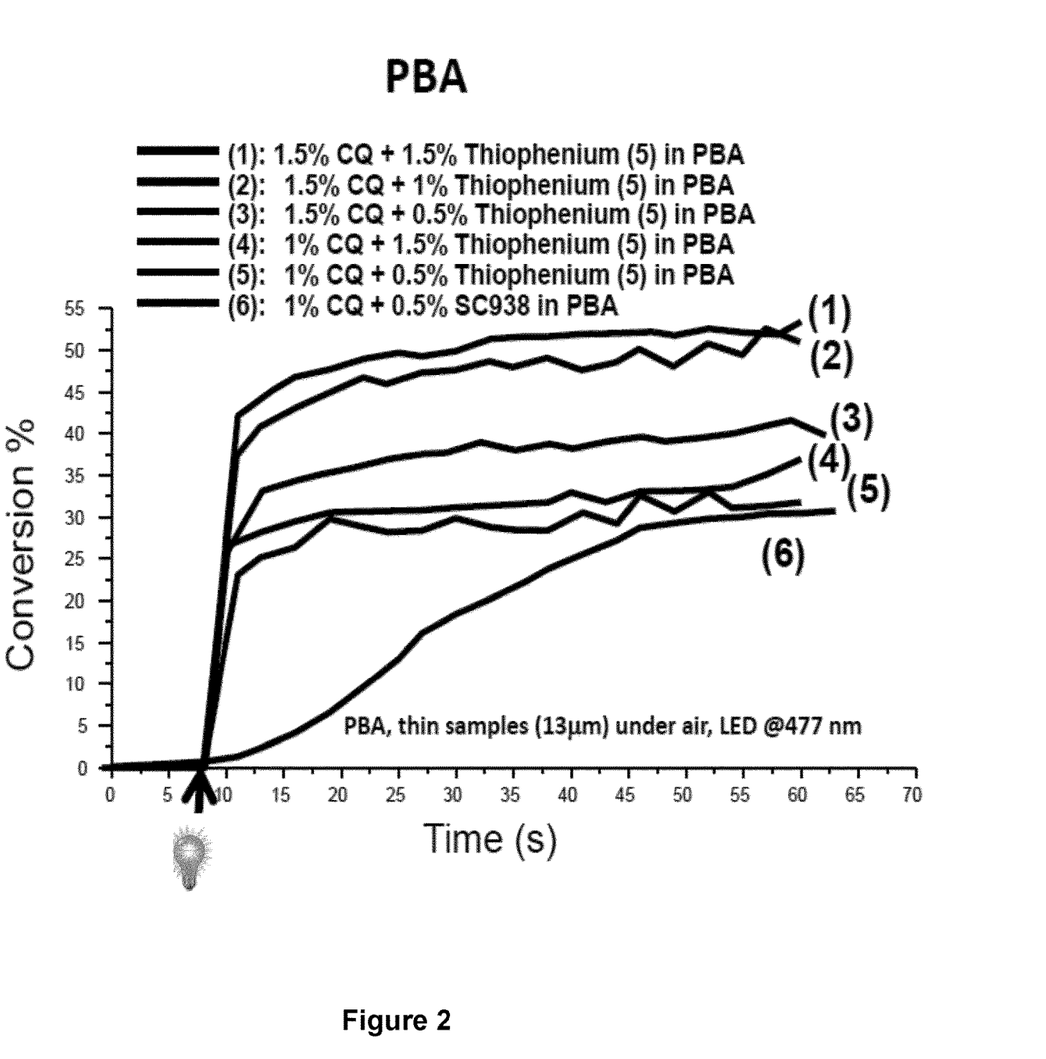
FIG. 2 depicts photopolymerization profiles of one specific thiophenium salt (5) as coinitiator in combination with CQ (both in several different amounts) in comparison to CQ in combination with an iodonium ion for polymerization of Prime & bond Active resins (a methacrylate resin)

Photopolymerization profiles (shown in FIG. 2) of C=C double bonds (PrimeBond Active) in presence of camphorquinone (CQ) as photoinitiator (under air; thickness=13 µm; SmartLite Focus 300 mW·cm$^{-2}$):

(1) CQ/Thiophenium 5 (1.5/1.5% w/w)
(2) CQ/Thiophenium 5 (1.5/1% w/w)
(3) CQ/Thiophenium 5 (1.5/0.5% w/w)
(4) CQ/Thiophenium 5 (1/1.5% w/w)
(5) CQ/Thiophenium 5 (1/0.5% w/w) and
(6) CQ/SC938 (1/0.5% w/w).

The irradiation (LED @ 477 nm) starts again at t=8 s (as depicted in FIG. 1).

Herein, it is clearly demonstrated that the inventive initiator systems based on a combination of CQ with a selective thiophenium compound, in this example Thiophenium 5, according to the set of claims offers superior photopolymerization conversion results versus an initiator system based on to the well-known established prior art system of CQ and a iodonium compound.

Furthermore, certain different ratios of the amount used of CQ and the respective Thiophenium 5 have been investigated. As can easily derived from FIG. 2, all photopolymerization results are promising, even when depending on the exact ratio, the results differ among each other more or less.

All initiator systems applied in Example 2 have shown good solubility. A too high amount of an initiator often limits its possible use due to severe solubility problems.

Afterwards these initiator systems have been successfully used to provide a transparent dental adhesive, which is not resulting in yellow-colored adhesive layers after curing (caused by unreacted photoinitiator like CQ) and which is at the same time not leading to a significant loss of polymerization efficiency.

The inventive initiator system presents therefore also exceptional bleaching properties upon irradiation with the blue dental LED as shown in Table 1.

TABLE 1

Optical inspection of dental adhesives of Example 2

| Plot No. of FIG. 2 | L value | A value | B value |
|---|---|---|---|
| 1 | 66.69 | −3.13 | 4.93 |
| 2 | 66.78 | −3.28 | 5.38 |
| 3 | 66.70 | −3.20 | 4.95 |
| 4 | 66.68 | −3.14 | 4.89 |
| 5 | 66.69 | −3.13 | 4.93 |
| 6 (Prior Art) | 66.73 | −3.19 | 4.92 |

Photos of the samples before and after polymerization have been taken. Based on these photos the L, a, and b values have been measured for each sample after irradiation. The respective polymerization has been executed under air; SmartLite Focus 300 mW/cm$^2$, in monomer Prime&Bond Active, the irradiation starts at t=5 s till t=120 s, thickness=13 µm.

Example 3: Preparation and Analysis of Different Dental Adhesive Compositions Making Use of Different Thiophenium Salts as Coinitiator in Combination With Different Amounts of CQ; in Comparison to CQ in Combination With a Tertiary Amine (DMABN)

All components were weighted into a brown glass flaked and stirred for 24 hours at room temperature. The solution was filtered with 0.45 µl PTFE filter.

The shear bond strength (SBS) of each example was measured according to ISO 29022 with a sample size of 7 instead of 15. The following Table 2 shows the results of experiments 3a to 3i, wherein all experiments are inventive examples except examples 3b and 3f, which are comparative examples.

TABLE 2

Experiments 3a to 3i including SBS analysis data

| Component | 3a [wt %] | 3b* [wt %] | 3c [wt %] | 3d [wt %] | 3e [wt %] | 3f* [wt %] | 3g [wt %] | 3h [wt %] | 3i [wt %] |
|---|---|---|---|---|---|---|---|---|---|
| MDP | 11.60 | 11.60 | 11.60 | 11.60 | 11.38 | 11.38 | 11.60 | 11.60 | 11.60 |
| PENTA | 5.03 | 5.03 | 5.03 | 5.03 | 4.94 | 4.94 | 5.03 | 5.03 | 5.03 |
| BAABE | 40.65 | 40.65 | 40.65 | 40.65 | 39.89 | 39.89 | 40.65 | 40.65 | 40.65 |
| BADEP | 4.62 | 4.62 | 4.62 | 4.62 | 4.53 | 4.53 | 4.62 | 4.62 | 4.62 |
| Isopropanol | 15.53 | 15.53 | 15.93 | 15.84 | 15.24 | 15.24 | 16.87 | 17.67 | 17.68 |
| Water | 19.54 | 19.54 | 19.54 | 19.54 | 19.18 | 19.18 | 19.54 | 19.54 | 19.54 |
| Thiophenium 3 | — | — | 1.00 | — | — | — | — | — | — |
| Thiophenium 1 | 0.65 | — | — | 1.09 | 2.50 | — | 1.09 | 0.55 | 0.28 |
| DMABN | — | 0.65 | — | — | — | 2.50 | — | — | — |
| Me2-DPI | 0.75 | 0.75 | — | — | 0.74 | 0.74 | — | — | — |
| CQ | 1.55 | 1.55 | 1.55 | 1.55 | 1.52 | 1.52 | 0.52 | 0.26 | 0.52 |
| DT-TBHQ | 0.08 | 0.08 | 0.08 | 0.08 | 0.08 | 0.08 | 0.08 | 0.08 | 0.08 |
| SUM | 100 | 100 | 100 | 100 | 100 | 100 | 100 | 100 | 100 |
| SBS Dentin Analysis | 30.51 | 30.28 | 36.1 | 38.3 | 34.4 | 33.8 | 32.7 | 33.0 | 31.9 |
| SBS Enamel Analysis | 27.66 | 27.31 | — | — | — | — | — | — | — |

Example 4: Systematic Investigation of Alternatives to Thiophenium 1 as Coinitiator in Combination With CQ; in Comparison to CQ in Combination With a Tertiary Amine for Polymerization of Prime & Bond Active Resins (a Methacrylate Resin)

The following two alternatives have been studied for comparison to thiophenium salts as coinitiator:

Sulfonium salt

Thianthrenium salt

Figure 3:
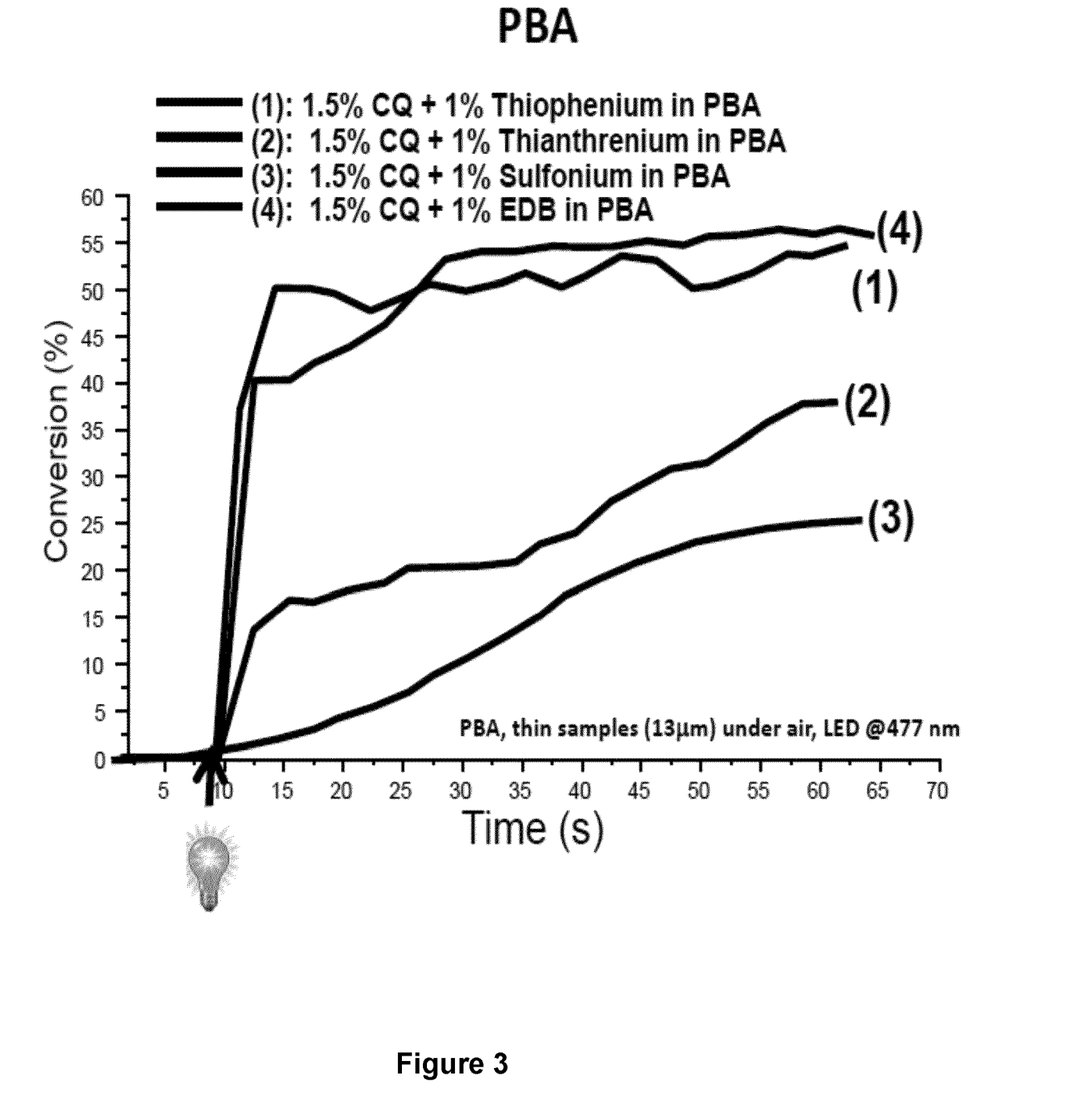
FIG. 3 depicts photopolymerization profiles of one specific thiophenium salt (1) as coinitiator in combination with CQ in comparison to CQ in combination with two alternatives to thiophenium for polymerization of Prime & bond Active resins (a methacrylate resin)

Photopolymerization profiles (shown in FIG. 3) of C=C double bonds (PrimeBond Active) in presence of camphorquinone (CQ) as photoinitiator (under air; thickness=13 μm; SmartLite Focus 300 mW·cm$^{-2}$):

(1) CQ/Thiophenium 1 (1.5/1% w/w)
(2) CQ/Thianthrenium (1.5/1% w/w)
(3) CQ/Sulfonium (1.5/1% w/w) and
(4) CQ/Ethyl-4-(dimethylamino)benzoate (EDB) (1.5/1% w/w).

The irradiation (LED @ 477 nm) starts at t=8 s (as depicted in FIG. 1).

TABLE 3

Optical inspection of dental adhesives of Example 4

| Plot No. of FIG. 3 | L value | A value | B value |
|---|---|---|---|
| 1 (Inventive Ex.) | 66.96 | −3.70 | 5.70 |
| 2 (Comp. Ex.) | 66.79 | −3.60 | 5.30 |
| 3 (Comp. Ex.) | 66.77 | −3.60 | 5.10 |
| 4 (Prior Art) | 66.88 | −3.70 | 6.20 |

Photos of the samples before and after polymerization have been taken. Based on these photos the L, a, and b values have been measured for each sample after irradiation. The respective polymerization has been executed under air; SmartLite Focus 300 mW/cm$^2$, in monomer Prime&Bond Active, the irradiation starts at t=5 s till t=120 s, thickness=13 μm.

As can be seen from comparing the photopolymerization conversion results, the planned alternatives to thiophenium compounds as claimed, namely thianthrenium or sulfonium salts, are not providing sufficient conversion percentages of the photopolymerization experiments, even when their optical values as determined afterwards are good enough to provide transparent dental adhesives.

Thus, even these chemically very similar compounds cannot provide the same good performances as the selected thiophenium compounds as claimed.

This proves that neither the selection of the exact thiophenium compound itself nor the selection of the chemical nature of this kind of compounds is irrelevant to arrive at the technical teaching of the present invention.

While the principles of the invention have been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims. The scope of the invention is limited only by the scope of the appended claims.

We claim:
1. Dental composition comprising
   a) at least one polymerizable monomer having at least one ethylenically unsaturated group; and
   b) a radical initiator system comprising
      i. a photosensitizer having an absorption maximum ranging from 400 nm to 800 nm; and
      ii. at least one coinitiator compound;
   wherein the at least one coinitiator compound is a thiophenium salt consisting of a thiophenium cation and a monovalent anion; wherein the thiophenium cation has a following formula (I):

(I)

wherein
$R_1$ is a hydrogen, a $C_1$-$C_8$ alkyl, or a $C_1$-$C_8$ alkyl having at least one hydrogen atom of said $C_1$-$C_8$ alkyl substituted by a halogen atom;
$R_2$, $R_3$, $R_4$, $R_5$, $R_6$, $R_7$, $R_8$, $R_9$ is a hydrogen, a $C_1$-$C_8$ alkyl, a $C_1$-$C_8$ alkyl having at least one hydrogen atom of said $C_1$-$C_8$ alkyl substituted by a halogen atom, or a halogen.

2. The dental composition according to claim 1 wherein the monovalent anion of the thiophenium salt is selected from a group consisting of a sulfonate, a substituted sulfonate, a borohydride, and a substituted borohydride.

3. The dental composition according to claim 2 wherein the monovalent anion of the thiophenium salt is selected from a group consisting of an alkyl sulfonate, a substituted alkyl sulfonate, a borohydride, and a substituted borohydride having at least one hydrogen atom of said borohydride substituted by a halogen atom.

4. The dental composition according to claim 3 wherein the monovalent anion of the thiophenium salt is selected from a group consisting of a substituted alkyl sulfonate having at least one hydrogen atom, preferably all hydrogen atoms, of the alkyl group of said alkyl sulfonate substituted by a halogen atom, and a substituted borohydride having all hydrogen atoms of said borohydride substituted by a halogen atom.

5. The dental composition according to claim 1 wherein the thiophenium cation has the following formula (II):

(II)

wherein
$R_4$, $R_7$, $R_{10}$, $R_{11}$, $R_{12}$ is a hydrogen, a $C_1$-$C_8$ alkyl, a $C_1$-$C_8$ alkyl having at least one hydrogen atom of said $C_1$-$C_8$ alkyl substituted by a halogen atom, or a halogen.

6. The dental composition according to claim 5 wherein $R_4$, $R_7$, $R_{10}$, $R_{11}$, $R_{12}$ is a hydrogen or a halogen.

7. The dental composition according to claim 1 wherein the thiophenium cation has one of the following formulas (III) or (IV):

(III)

(IV)

8. The dental composition according to claim 1 wherein the thiophenium salt is present in an amount of from 0.1 to 5 percent by weight based on a total weight of the dental composition.

9. The dental composition according to claim 1 wherein the photosensitizer is present in an amount of from 0.1 to 5 percent by weight, based on a total weight of the dental composition.

10. The dental composition according to claim 1 wherein a ratio of an amount of the photosensitizer to an amount of coinitiator is ranging from 1:2.5 to 2.5:1.

11. The dental composition according to claim 1 wherein the dental composition further comprises an additive selected from iodonium salts, phosphonium salts, and sulfonium salts.

12. The dental composition according to claim 11 wherein the additive is present in an amount of from 0.01 to 5 percent by weight based on a total weight of the dental composition.

13. The dental composition according to claim 1 wherein the photosensitizer is a 1,2-diketone compound.

14. The dental composition according to claim 1 wherein the radical initiator system is present in an amount of from 0.1 to 10 percent by weight based on a total weight of the dental composition.

15. The dental composition according to claim 1 wherein the dental composition comprises a radical initiator system, which is at least substantially free of amines.

16. The dental composition according to claim 5 wherein $R_4$ and $R_7$ are independently a hydrogen or a halogen, and $R_{10}$, $R_{11}$, $R_{12}$ are a halogen.

* * * * *